(12) United States Patent
Akiya et al.

(10) Patent No.: US 11,518,386 B2
(45) Date of Patent: Dec. 6, 2022

(54) VEHICLE SYSTEM

(71) Applicant: MAZDA MOTOR CORPORATION, Hiroshima (JP)

(72) Inventors: Yuichiro Akiya, Aki-gun (JP); Chikako Ohisa, Aki-gun (JP); Keitaro Ezumi, Aki-gun (JP); Akira Tsuda, Aki-gun (JP); Daisaku Ogawa, Aki-gun (JP); Daisuke Umetsu, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 247 days.

(21) Appl. No.: 16/825,777

(22) Filed: Mar. 20, 2020

(65) Prior Publication Data

US 2020/0377093 A1 Dec. 3, 2020

(30) Foreign Application Priority Data

May 30, 2019 (JP) .............................. JP2019-101344

(51) Int. Cl.
*B60W 30/18* (2012.01)
*B60W 10/06* (2006.01)
*B60W 10/08* (2006.01)

(52) U.S. Cl.
CPC ............ *B60W 30/18* (2013.01); *B60W 10/06* (2013.01); *B60W 10/08* (2013.01);
(Continued)

(58) Field of Classification Search
CPC ...... B60W 30/18; B60W 10/06; B60W 10/08; B60W 2510/0604; B60W 2510/205;
(Continued)

(56) References Cited

U.S. PATENT DOCUMENTS 6,390,214 B1 * 5/2002 Takahashi ............... B60L 50/16
60/710
2012/0259529 A1 10/2012 Matthews
(Continued)

FOREIGN PATENT DOCUMENTS

DE 102015117114 A1 4/2016
DE 102016013189 A1 5/2017
(Continued)

OTHER PUBLICATIONS

European Patent Office, Extended European Search Report Issued in Application No. 20164887.0, dated Sep. 1, 2020, Germany, 8 pages.

*Primary Examiner* — Tyler J Lee
*Assistant Examiner* — Yufeng Zhang
(74) *Attorney, Agent, or Firm* — Alleman Hall Creasman & Tuttle LLP

(57) ABSTRACT

A vehicle system comprises an engine, a motor-generator and a controller. The engine has a combustion mode in which a part of an air-fuel mixture is combusted by spark ignition, and then the remaining air-fuel mixture is combusted by self-ignition. The controller sets a target additional deceleration based on a steering angle, when a steering wheel is turned, and sets an air-fuel ratio of the air-fuel mixture to either one of a first air-fuel ratio and a second air-fuel ratio which is on a lean side, based on an operating state, when the engine performs the combustion mode. The controller controls an ignition timing so as to generate the target additional deceleration in the first air-fuel ratio, and controls a regenerative electric power generation of the motor-generator so as to generate the target additional deceleration in the second air-fuel ratio.

14 Claims, 8 Drawing Sheets

(52) U.S. Cl.
CPC ............... *B60W 2510/0604* (2013.01); *B60W 2510/205* (2013.01); *B60W 2720/10* (2013.01)

(58) Field of Classification Search
CPC ....... B60W 2720/10; B60W 2720/106; B60W 2540/18; B60W 30/18136; B60W 30/18127; B60W 30/18145; B60W 30/182; B60W 2510/0619; B60W 20/15; B60K 6/485; F02D 37/02; F02D 41/3041; Y02T 10/62; Y02T 10/72
See application file for complete search history.

(56) References Cited

U.S. PATENT DOCUMENTS

| | | |
|---|---|---|
| 2016/0101770 A1 | 4/2016 | Yamakazi et al. |
| 2017/0129480 A1 | 5/2017 | Sunahara et al. |
| 2017/0145931 A1 | 5/2017 | Ohisa et al. |
| 2018/0266356 A1 | 9/2018 | Ujihara et al. |
| 2019/0101071 A1 | 4/2019 | Inoue et al. |
| 2019/0353071 A1* | 11/2019 | Camuglia ............... F01N 3/208 |

FOREIGN PATENT DOCUMENTS

| | | |
|---|---|---|
| DE | 112016004369 T5 | 6/2018 |
| JP | 2017096142 A | 6/2017 |
| WO | 2018096744 A1 | 5/2018 |

* cited by examiner

VEHICLE SYSTEM

BACKGROUND OF THE INVENTION

Field of the Invention

The present invention relates to a vehicle system for controlling the attitude of a vehicle according to steering manipulation.

Description of Related Art

Heretofore, there has been known a technique of, in a situation where the behavior of a vehicle becomes unstable due to road wheel slip or the like, controlling the vehicle behavior to enable a safe traveling (e.g., an antiskid brake system). Specifically, there has been known a technique of detecting the occurrence of vehicle understeer or oversteer behavior during vehicle cornering or the like, and responsively giving appropriate deceleration to one or more road wheels so as to suppress such a behavior.

As a different type of control from the above control for improving safety in a traveling condition causing the vehicle behavior to become unstable, there has been known a technique of changing a torque to be given to a vehicle, during manipulation of a steering wheel (hereinafter also referred to simply as "steering"), thereby controlling the attitude of a vehicle so as to allow a series of driver's manipulations during cornering to become natural and stable (see, for example, Patent Document 1 (JP 2017-096142A)). Particularly, in the technique described in the Patent Document 1, the vehicle attitude is controlled by controlling an ignition timing of an engine so as to change the torque according to the steering manipulation, specifically by retarding the ignition timing so as to reduce the torque according to the steering manipulation. In the following description, such a technique of controlling the attitude of a vehicle according to the steering manipulation will be referred to occasionally as "vehicle attitude control".

Meanwhile, in recent years, there has been developed premixed charge compression ignition combustion in which a mixture of air and gasoline fuel is sufficiently compressed in a cylinder so as to be combusted by self-ignition. There has also been proposed partially premixed charge compression ignition combustion using a combination of spark ignition (SI) combustion and compression ignition (CI) combustion, instead of causing an air-fuel mixture to be entirely combusted by self-ignition (see, for example, Patent Document 2 (WO2018/096744A)). This partially premixed charge compression ignition combustion is configured such that a part of an air-fuel mixture is forcibly combusted based on flame propagation triggered by spark ignition of a spark plug (SI combustion), and then the remaining unburned air-fuel mixture is combusted by self-ignition (CI combustion). In the following description, this partially premixed charge compression ignition combustion will be referred to occasionally as "spark controlled compression ignition (SPCCI) combustion".

BRIEF SUMMARY OF THE INVENTION

Technical Problem

In a vehicle equipped with an engine capable of the SPCCI combustion as described in the Patent Document 2, there is a need for executing vehicle attitude control. However, if, during the process of the SPCCI combustion, the ignition timing is changed for the vehicle attitude control as in the technique described in the Patent Document 1, the SPCCI combustion is likely to become unstable, leading to the occurrence of misfire. Particularly, in a case where the ignition timing is changed for the vehicle attitude control during execution of a combustion mode in which the SPCCI combustion is performed at an air-fuel ratio of an air-fuel mixture set to a lean side with respect to a stoichiometric (theoretical) or richer air-fuel ratio, misfire is highly likely to occur, because self-ignition is less likely to be induced due to the relatively lean air-fuel mixture.

The present invention has been made to solve the above conventional problem, and an object thereof is to provide a vehicle system capable of adequately executing vehicle attitude control while ensuring combustion stability, during the process of compression ignition combustion in which an air-fuel ratio of an air-fuel mixture is set to a lean side with respect to the stoichiometric (theoretical) or richer air-fuel ratio.

Solution to Problem

In order to achieve the above object, there is a provided a vehicle system for a front-wheel drive vehicle. The vehicle system comprises: an engine comprising a spark plug and connecting with front road wheels; a rotary electric machine connecting with road wheels; an operating state sensor configured to detect an operating state of the engine; a steering wheel configured to be manipulated by a driver; a steering angle sensor configured to detect a steering angle corresponding to the manipulation of the steering wheel; and a controller configured to control the engine and the rotary electric machine, and composed of a circuitry, wherein the controller has a combustion mode in which a part of an air-fuel mixture in a cylinder of the engine is combusted by spark ignition of the spark plug, and then the remaining air-fuel mixture in the cylinder is combusted by self-ignition, and wherein the controller is configured: to set a target additional deceleration to be added to the vehicle, based on the steering angle detected by the steering angle sensor, when a turning manipulation of the steering wheel is performed; to set an air-fuel ratio of the air-fuel mixture to either one of a first air-fuel ratio and a second air-fuel ratio which is on a lean side with respect to the first air-fuel ratio, based on the operating state of the engine detected by the operating state sensor, when the engine is controlled to perform the combustion mode; to control an ignition timing of the spark plug so as to generate the target additional deceleration in the vehicle, when the first air-fuel ratio is set; and to control a regenerative electric power generation of the rotary electric machine so as to generate the target additional deceleration in the vehicle, when the second air-fuel ratio is set.

In the vehicle system of the present invention having the above feature, when the compression ignition combustion (in particular, SPCCI combustion) is performed at the first air-fuel ratio, the ignition timing of the spark plug is controlled to generate the target additional deceleration in the vehicle, whereas, when the compression ignition combustion is performed at the second air-fuel ratio which is on a lean side with respect to the first air-fuel ratio, the regenerative electric power generation of the rotary electric machine is controlled to generate the target additional deceleration in the vehicle. That is, the controller is operable, when the second air-fuel ratio is set, to generate the target additional deceleration in the vehicle by causing the rotary electric machine to perform regenerative electric power generation, without changing the ignition timing of the engine. This makes it possible to adequately execute the vehicle attitude control while ensuring combustion stability, during the process of compression ignition combustion in which the air-fuel ratio of the air-fuel mixture is set to a lean side with respect to the stoichiometric or richer air-fuel ratio.

Preferably, in the vehicle system of the present invention, the rotary electric machine connects with the road wheels via a winding member, and wherein the controller is configured to suppress a generation of road wheel-driving torque by the rotary electric machine, when the second air-fuel ratio is set.

According to this feature, the controller is configured to, during the period during which the second air-fuel ratio is set, suppress generation of driving torque (road wheel-driving torque) by the rotary electric machine, i.e., suppress engine torque assist of the rotary electric machine. This makes it possible to suppress a delay in regenerative action of the rotary electric machine for the vehicle attitude control, when this control is executed in the period during which the second air-fuel ratio is set. Specifically, by suppressing engine torque assist of the rotary electric machine, the winding member connecting with the rotary electric machine can be always tensioned in a direction effecting the regenerative action of the rotary electric machine (regeneration direction). Thus, upon a request for the vehicle attitude control made in the period during which the second air-fuel ratio is set, it becomes possible to quickly cause the rotary electric machine to preform regenerative electric power generation, thereby adequately realizing the desired vehicle attitude control.

Preferably, in the above vehicle system, the winding member is a belt.

The belt has a relatively easily stretchable property, so that it takes time from a state in which the belt is tensioned in a direction effecting the engine torque assist of the rotary electric machine (torque assist direction) through until the belt is tensioned in the regeneration direction which is a direction opposite to the torque assist direction. Therefore, when the winding member composed of a belt is employed in the present invention, the engine torque assist of the rotary electric machine is suppressed during the period during which the second air-fuel ratio is set, so that it becomes possible to effectively suppress a delay in regenerative action of the rotary electric machine, when the vehicle attitude control is executed in the period during which the second air-fuel ratio is set.

Preferably, in the vehicle system of the present invention, the first air-fuel ratio is a stoichiometric air-fuel ratio or an air-fuel ratio on a richer side than the stoichiometric air-fuel ratio.

According to this feature, the first air-fuel ratio is set around the stoichiometric air-fuel ratio, so that it is possible to adequately ensure exhaust emission performance of the engine.

Preferably, in the vehicle system of the present invention, the second air-fuel ratio is an air-fuel ratio on a leaner side than a stoichiometric air-fuel ratio.

According to this feature, the second air-fuel ratio is set to a leaner side than the stoichiometric air-fuel ratio, so that it is possible to adequately ensure fuel economy performance and exhaust emission performance of the engine.

Preferably, in the vehicle system of the present invention, the second air-fuel ratio is defined as a weight ratio of air to fuel in the air-fuel mixture, and wherein the weight ratio is set in a range of 25 to 30.

According to this feature, it is possible to effectively improve the fuel economy performance and exhaust emission performance of the engine.

Preferably, in the vehicle system of the present invention, the controller is configured to calculate a steering speed from the steering angle detected by the steering angle sensor, and set the target additional deceleration based on the steering speed.

According to this feature, it is possible to, when executing the vehicle attitude control, adequately add, to the vehicle, a deceleration according to the steering manipulation by the driver.

Preferably, in the vehicle system of the present invention, the controller is configured: to set a target torque of the engine so as to realize a target acceleration set based on an accelerator position; to determine a basic ignition timing of the spark plug so as to realize the target torque; and to retard the ignition timing of the spark plug with respect to the basic ignition timing so as to generate the target additional deceleration in the vehicle, when the first air-fuel ratio is set.

Preferably, in the vehicle system of the present invention, in a situation where the second air-fuel ratio is set, the controller is configured to generate the target additional deceleration in the vehicle by increasing an amount of the generative electric power generation of the rotary electric machine when the turning manipulation of the steering wheel is performed, more than when the turning manipulation of the steering wheel is not performed.

Preferably, in the vehicle system of the present invention, in a situation where the second air-fuel ratio is set, the controller is configured to generate the target additional deceleration in the vehicle by increasing an amount of the generative electric power generation of the rotary electric machine, instead of retarding the ignition timing of the spark plug with respect to the basic ignition timing.

The vehicle system of the present invention can adequately execute the vehicle attitude control while ensuring combustion stability, during the process of the compression ignition combustion in which the air-fuel ratio of the air-fuel mixture is set to a lean side with respect to the stoichiometric or richer air-fuel ratio.

DETAILED DESCRIPTION OF THE INVENTION

With reference to the accompanying drawings, a vehicle system according to one embodiment of the present invention will now be described.

<Configuration of Vehicle>

Figure 1:
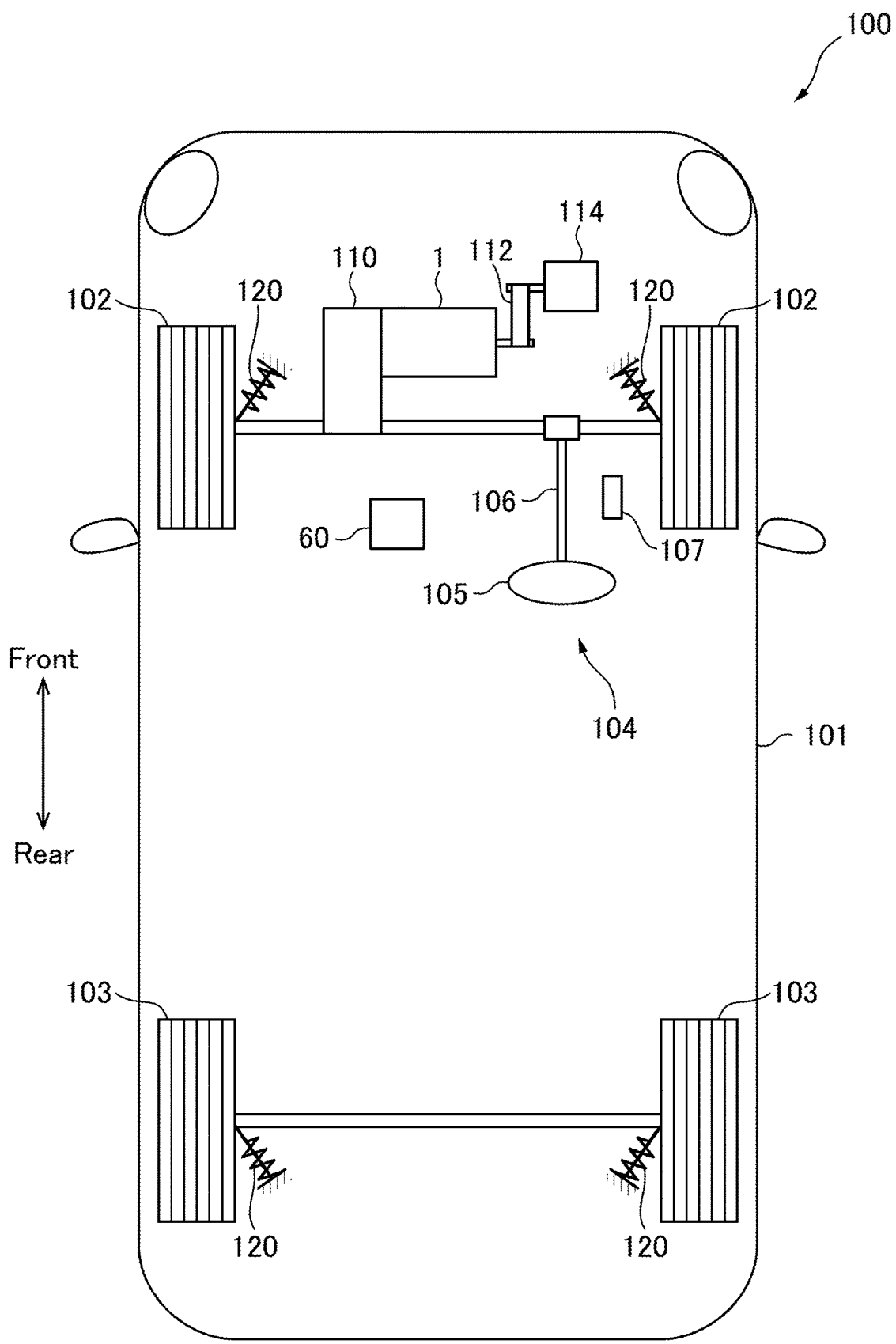
FIG. 1 is a block diagram showing the overall configuration of a vehicle employing a vehicle system according to one embodiment of the present invention.

FIG. 1 is a block diagram showing the overall configuration of a vehicle employing the vehicle system according to this embodiment. As shown in FIG. 1, the vehicle 100 employing the vehicle system according to this embodiment is a front-engine, front-wheel drive (FF) vehicle, and comprises an engine 1 as a main drive source. For example, the engine 1 is an in-line four cylinder engine equipped with non-illustrated four cylinders and capable of SI combustion, and SPCCI combustion (partially premixed charge compression ignition combustion or spark controlled compression ignition combustion).

The vehicle 100 comprises: a vehicle body 101 on which the engine 1 and others are mounted; a pair of front road wheels 102 serving as drive wheels and steerable wheels; and a pair of rear road wheels 103 serving as driven wheels. Each of the front road wheels 102 and the rear road wheels 103 are supported by a suspension 120 with respect to the vehicle body 101. A driving force generated by the engine 1 is transmitted to the front road wheels 102 via a transmission 110. The vehicle 100 further comprises: a steering device 104 comprising a steering wheel (steering) 105 for steering the front wheels 102, and a steering shaft 106; and an accelerator pedal 107 to be manipulated by a driver.

Further, the vehicle 100 is equipped with a motor-generator 114 having a function of driving the front road wheels 102 (i.e., a function as an electric motor), and a function of performing regenerative electric power generation while being driven by the front wheels 102 (i.e., a function as a generator). Specifically, a force is transmitted between the motor-generator 114 and the front wheels 102, via a rubber belt 112 serving as a winding member, the engine 1, the transmission 110 and others. The motor-generator 114 is connected to a non-illustrated battery, and configured to be supplied with electric power from the battery, when generating a driving torque, and to supply electric power to the battery to recharge the battery, when generating (regenerating) electric power.

Further, the vehicle 100 is equipped with a controller 60. The controller 60 is configured to control the engine 1, the motor-generator 114 and others, based on detection signals output from the after-mentioned various sensors in the vehicle 100. Strictly, the controller 60 is configured to control the motor-generator 114 via a non-illustrated inverter.

<Configuration of Engine>

Figure 2:
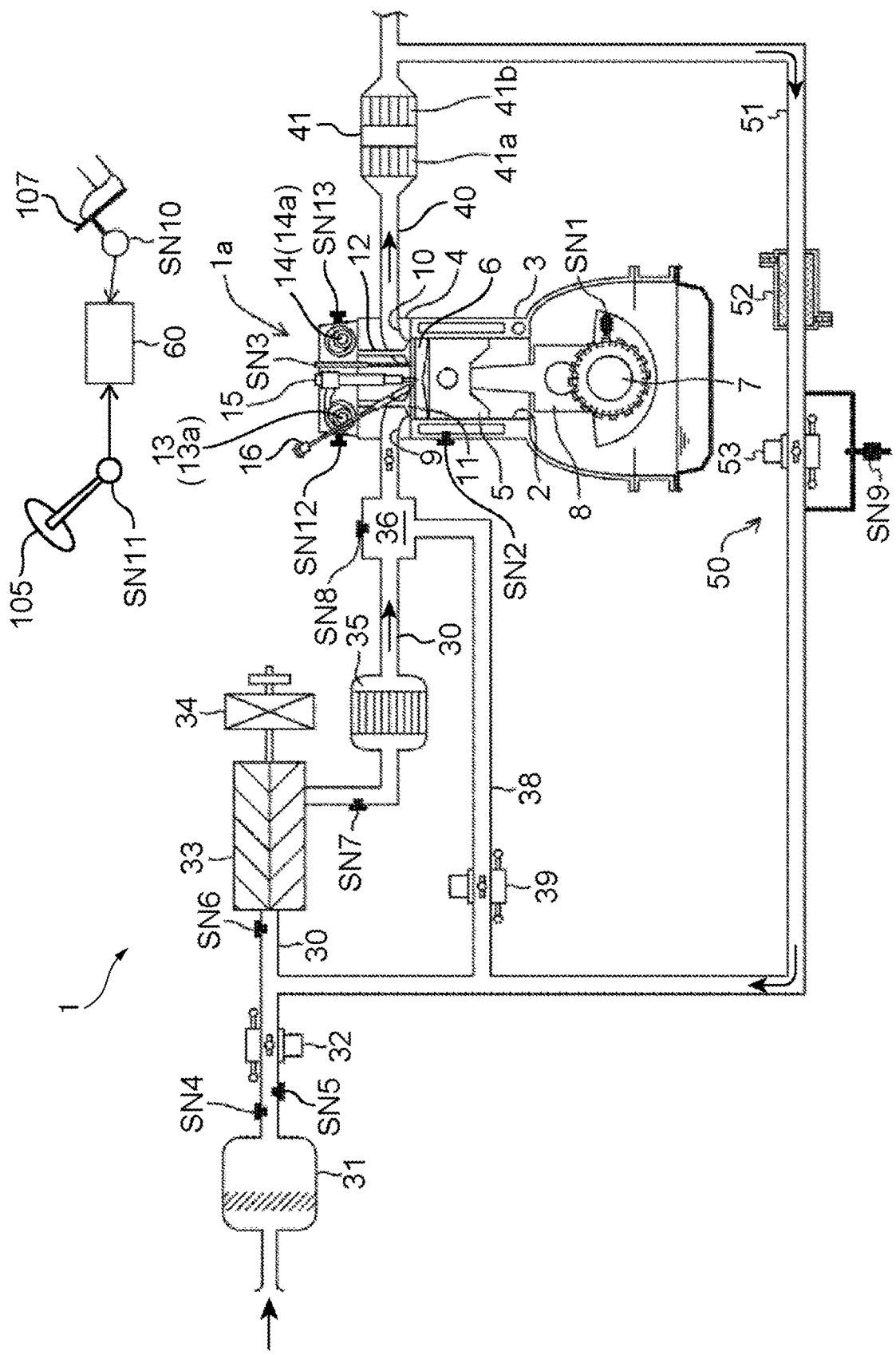
FIG. 2 is a schematic configuration diagram of an engine in the vehicle system according to this embodiment.

FIG. 2 is a schematic configuration diagram of the engine in the vehicle system according to this embodiment. The engine 1 comprises: an engine body 1a composed of a four-stroke direct gasoline-injection engine; an intake passage 30 for allowing intake air to flow therethrough so as to be introduced into the engine body 1a; an exhaust passage 40 for allowing exhaust gas discharged from the engine body 1a to flow therethrough; and an EGR device 50 for allowing the exhaust gas flowing through the exhaust passage to be partly recirculated to the intake passage 30.

The engine 1 is used as a drive source of the vehicle 100. In this embodiment, the engine 1 is of a type to be driven by receiving supply of fuel consisting mainly of gasoline. Here, the fuel may be gasoline containing bioethanol or the like. The engine body 1a comprises a cylinder block 3, a cylinder head 4, and four pistons 5. The cylinder block 3 has four cylinder liners each forming therein a respective one of the cylinders. The cylinder head 4 is attached to an upper surface of the cylinder block 3 to close an upper opening of each of the cylinders 2. Each of the pistons 5 is received in a respective one of the cylinders 2 in a reciprocatingly slidable manner, and coupled to a crankshaft 7 via a connecting rod 8. The crankshaft 7 is configured to be rotated about a central axis thereof according to reciprocating movement of the piston 5.

A combustion chamber 6 is defined above each of the pistons 5. Fuel is injected and supplied from the after-mentioned injector 15 into the combustion chamber 6. Then, a mixture of air and the supplied fuel is combusted in the combustion chamber 6, so that the piston 5 pushed downwardly by an expansive force of the combustion will be reciprocatingly moved in an upward-downward direction. A geometric compression ratio of the cylinder 2, i.e., a ratio of the volume of the combustion chamber 6 as measured when the piston 5 is at a top dead center position to the volume of the combustion chamber 6 as measured when the piston 5 is at a bottom dead center position, is set to a high compression ratio of 13 to 30 (e.g., about 20) so as to become suited to the after-mentioned SPCCI combustion.

The cylinder block 3 is installed with a crank angle sensor SN1 and a water temperature sensor SN2. The crank angle sensor SN1 is configured to detect a rotational angle of the crankshaft 7 (crank angle), and a rotational speed of the crankshaft 7 (engine speed). The water temperature sensor SN2 is configured to detect the temperature of cooling water flowing through the cylinder block 3 and the cylinder head 4 (engine water temperature).

With respect to each of the cylinders 2, the cylinder head 4 is formed with an intake port 9 and an exhaust port 10 each communicated with the combustion chamber 6. A bottom surface of the cylinder head serves as a ceiling surface of the combustion chamber 6. The ceiling surface of the combustion chamber is formed with an intake-side opening which is a downstream end of the intake port 9, and an exhaust-side opening which is an upstream end of the exhaust port 10. Further, an intake valve 11 for opening and closing the intake-side opening and an exhaust valve 12 for opening and closing the exhaust-side opening are assembled to the cylinder head 4. Although illustration is omitted, a type of valve layout in the engine body 1a is an intake-side two-valve× exhaust-side two-valve, four-valve type in which each of the intake port 9 and the exhaust port 10 is provided by a number of two (one pair) per cylinder 2, and each of the intake value 11 and the exhaust valve 12 is also provided by a number of two (one pair) per cylinder 2.

The cylinder head 4 is provided with an intake-side valve operating mechanism 13 and an exhaust-side valve operating mechanism 14 each comprising a camshaft. Each of the pair of intake valves 11 and the pair of exhaust valves 12 is configured to be driven by a corresponding one of the valve operating mechanisms 13, 14 in an openable and closeable manner, interlockingly with the rotation of the crankshaft 7.

The intake-side valve operating mechanism 13 has a built-in intake-side variable valve timing mechanism (intake VVT) 13a capable of changing at least a valve opening timing of the pair of intake valves 11. Similarly, the exhaust-side valve operating mechanism 14 has a built-in exhaust-side variable valve timing mechanism (exhaust VVT) 14a capable of changing at least a valve closing timing of the pair of exhaust valves 12. By controlling the intake VVT 13a and the exhaust VVT 14a, it is possible to adjust a valve overlap period during which both the pair of intake valves 11 and the pair of exhaust valves 12 are maintained in an open state across top dead center of an exhaust stroke. Further, by adjusting the valve overlap period, it is possible to adjust the amount of burned gas (internal EGR gas) remaining in the combustion chamber 6.

With respect to each of the cylinders 2, the cylinder head 4 is further provided with an injector 15 (fuel injection valve) and a spark plug 16. The injector 15 is configured to inject fuel into the cylinder 2 (combustion chamber 6). As the injector 15, it is possible to use a multi-hole injector capable of injecting fuel in a radial pattern from a plurality of nozzle holes formed at a distal end thereof. The injector 15 is disposed such that the distal end thereof is exposed to the inside of the combustion chamber 6, and opposed to a radially central region of a crown surface of the piston 5.

The spark plug 16 is disposed at a position slightly offset toward the intake side with respect to the injector 15, and a distal end (electrode) thereof is disposed at a position facing the inside of the cylinder 2. The spark plug 16 is a forced ignition source for igniting an air-fuel mixture formed in the cylinder 2 (combustion chamber 6).

The cylinder head 4 is installed with an in-cylinder pressure sensor SN3, an intake cam angle sensor SN12 and an exhaust cam angle sensor SN13 each serving as a sensing element. The in-cylinder pressure sensor SN3 is configured to detect an internal pressure of the combustion chamber 6 in each of the cylinders 2 (in-cylinder pressure). The intake cam angle sensor SN12 is configured to detect a rotational position of the camshaft (cam angle) of the intake-side valve operating mechanism 13, and the exhaust cam angle sensor SN13 is configured to detect a rotational position of the camshaft (cam angle) of the exhaust-side valve operating mechanism 14.

As shown in FIG. 2, the intake passage is connected to one lateral surface of the cylinder head 4, in such a manner as to be communicated with the pair of intake ports 9 in each of the cylinders 2. Air (flesh air) taken from an upstream end of the intake passage 30 is introduced into the combustion chamber 6 through the intake passage 30 and the pair of intake ports 9. The intake passage 30 is provided with an air cleaner 31, a throttle valve 32, a supercharger 33, an electromagnetic clutch 34, an intercooler 35, and a surge tank 36, which are arranged in this order from the upstream end thereof.

The air cleaner 31 is configured to remove foreign substances contained in intake air, thereby cleaning the intake air. The throttle valve 32 is configured to open and close the intake passage 30, interlockingly with a depressing movement of the accelerator pedal 107, thereby adjusting the flow rate of intake air in the intake passage 30. The supercharger 33 is configured to compress intake air and send the compressed intake air toward a downstream end of the intake passage 30. The supercharger 33 is a mechanical supercharger mechanically coupled to the engine body 1a, and configured such that engagement with the engine body 1a and release of the engagement are switched by the electromagnetic clutch 34. When the electromagnetic clutch 34 is engaged, a driving force is transmitted from the engine body 1a to the supercharger 33, to drive the supercharger 33 to perform supercharging. The intercooler 35 is configured to cool the intake air compressed by the supercharger 33. The surge tank 36 is a tank disposed immediately upstream of a non-illustrated intake manifold to provide a space for equally distributing intake air to the four cylinders 2.

The intake passage 30 is provided with: an air flow sensor SN4 to detect the flow rate of intake air; first and second intake temperature sensors SN5, SN7 to detect the temperature of intake air; first and second intake pressure sensors SN6, SN8 to detect the pressure of intake air, in respective regions thereof. The air flow sensor SN4 and the first intake temperature sensor SN5 are disposed in a region between the air cleaner 31 and the throttle valve 32 in the intake passage 30 to detect the flow rate and the temperature of intake air passing through the region, respectively. The first intake pressure sensor SN6 is disposed in a region between the throttle valve 32 and the supercharger 33 (downstream of a connection with a downstream end of the after-mentioned EGR passage 51) in the intake passage 30, to detect the pressure of intake air passing through the region. The second intake temperature sensor SN7 is disposed in a region between the supercharger 33 and the intercooler 35 in the intake passage 30 to detect the temperature of intake air passing through the region. The second intake pressure sensor SN8 is disposed in the surge tank 36 to detect the pressure of intake air inside the surge tank 36.

The intake passage 30 includes a bypass passage 38 for sending intake air to the combustion chambers 6 while bypassing the supercharger 33. The bypass passage 38 mutually connects the surge tank 36 and the vicinity of the downstream end of the after-mentioned EGR passage 51. The bypass passage 38 is provided with a bypass valve 39 capable of selectively opening and closing the bypass passage 38.

The exhaust passage 40 is connected to the other lateral surface of the cylinder head 4, in such a manner as to be communicated with the pair of exhaust ports 10 in each of the cylinders 2. Burned gas (exhaust gas) produced in the combustion chamber 6 is discharged to the outside of the vehicle 100 through the pair of exhaust ports 10 and the exhaust passage 40. The exhaust passage 40 is provided with a catalytic converter 41. The catalytic converter 41 houses a three-way catalyst 41a for purifying harmful components (HC, CO, NOx) contained in exhaust gas flowing through the exhaust passage 40, and a gasoline particulate filter (GPF) 41b for capturing particulate matter (PM) contained in the exhaust gas.

The EGR device 50 comprises: an EGR passage 51 connecting the exhaust passage 40 and the intake passage 30; and an EGR cooler 52 and an EGR valve 53 each provided in the EGR passage 51. The EGR passage 51 mutually connects a region of the exhaust passage 40 located downstream of the catalytic converter 41 and a region of the intake passage 30 located between the throttle valve 32 and the supercharger 33. The EGR cooler 52 is configured to cool exhaust gas (external EGR gas) which is being recirculated from the exhaust passage 40 to the intake passage 30 through the EGR passage 51, in a heat-exchanging manner. The EGR valve 53 is provided in the EGR passage 51 in a selectively openable and closable manner at a position downstream of the EGR cooler 52 to adjust the flow rate of exhaust gas flowing through the EGR passage 51. The EGR passage 51 is installed with a pressure difference sensor SN9 to detect a difference between the pressure of the external EGR gas at a position upstream of the EGR valve 53 and the pressure of the external EGR gas at a position downstream of the EGR valve 53.

The accelerator pedal 107 is provided with an accelerator position sensor SN10 to detect a relative position of the accelerator pedal 107 (accelerator position). Specifically, the accelerator position sensor SN10 is a sensor to detect the degree of depression of the accelerator pedal 107, and also a sensor to detect driver's acceleration/deceleration manipulation. The steering wheel 105 is provided with a steering angle sensor SN11. The steering angle sensor SN11 is configured to detect a steering angle of the front wheels 102 based on a rotation angle of the steering wheel 105. It should be understood that it is possible to use any other type of steering angle sensor capable of detecting a steering angle of the front wheels 102 (e.g., a sensor to directly detecting a steered angle (tire angle) of the front wheels 102.

<Control Configuration>

Figure 3:
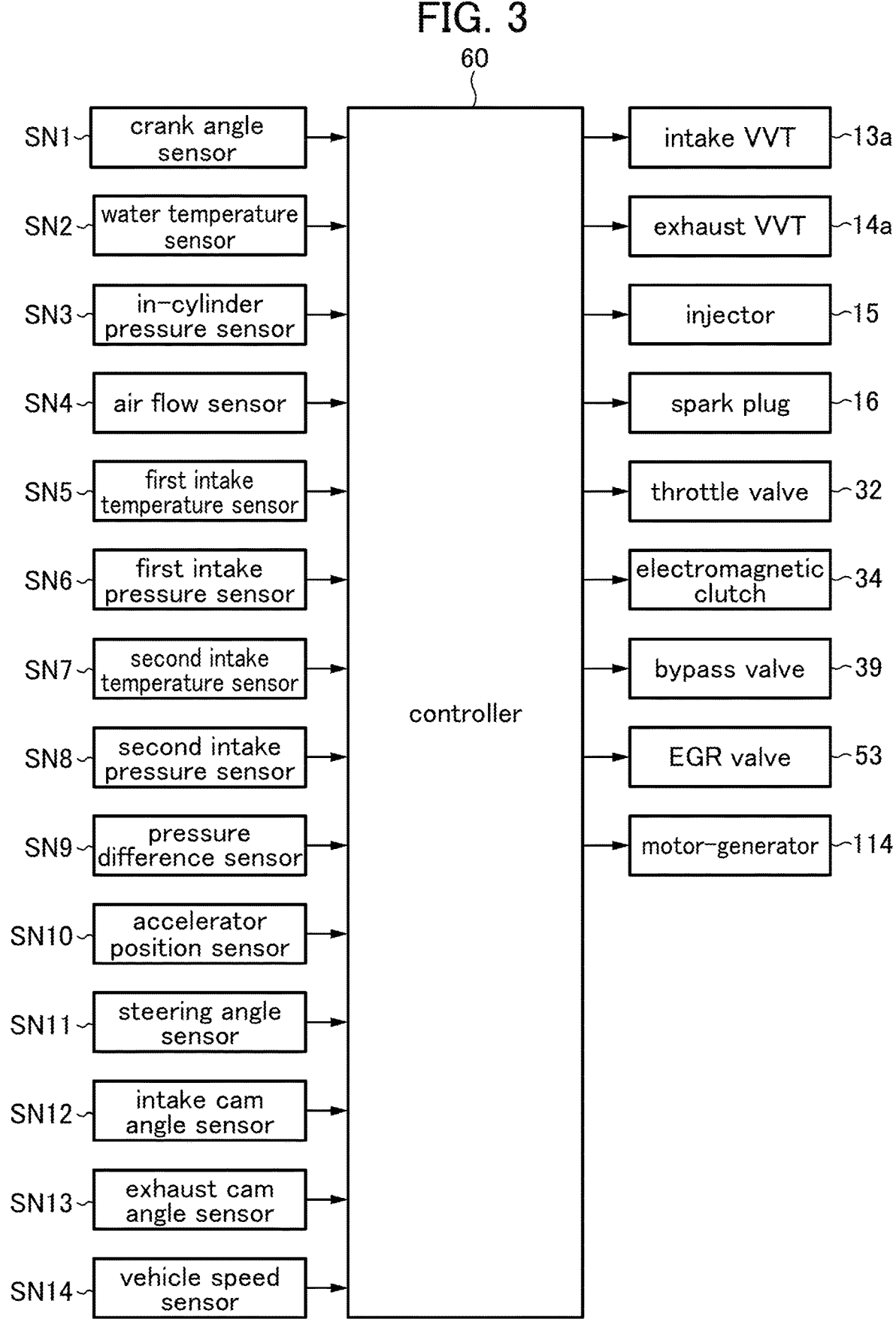
FIG. 3 is a block diagram showing a control configuration of the vehicle system according to this embodiment.

FIG. 3 is a block diagram showing a control configuration of the vehicle system according to this embodiment. As shown in FIG. 3, the controller 60 is a controller comprised of a circuitry and based on a well-known microcomputer, and comprises: a microprocessor serving as a central processing unit (CPU) for executing a program; a memory composed of, e.g., a random access memory (RAM) and a read only memory (ROM) and capable of storing therein a program and data; and an input-output bus for inputting and outputting electric signals.

The controller 60 is configured to accept an input of detection signals from various sensors installed in the vehicle 100. The controller 60 is electrically connected with the crank angle sensor SN1, the water temperature sensor SN2, the in-cylinder pressure sensor SN3, the air flow sensor SN4, the first and second intake temperature sensors SN5, SN7, the first and second intake pressure sensors SN6, SN8, the pressure difference sensor SN9, the accelerator position sensor SN10, the steering angle sensor SN11, the intake cam angle sensor SN12 and the exhaust cam angle sensor SN13, and further electrically connected with a vehicle speed sensor SN14. Information detected by these sensors SN1 to SN14, i.e., information such as the crank angle, the engine speed, the engine water temperature, the in-cylinder pressure, the intake air flow rate, the intake air temperature, the intake air pressure, the pressure difference before and after the EGR valve 53, the accelerator position, the steering angle, the intake and exhaust cam angles, and the vehicle speed, is sequentially input to the controller 60.

The controller 60 is operable to control each part of the engine while executing various determinations and calculations based on input signals from the sensors SN1 to SN14 and others. Specifically, the controller 60 is electrically connected to the intake VVT 13*a*, the exhaust VVT 14*a*, the injector 15, the spark plug 16, the throttle valve 32, the electromagnetic clutch 34, and the bypass valve 39, the EGR valve 53, the motor-generator 114, and others, and is operable, based on a result of the calculation, etc., to output control signals, respectively, to the above devices.

In this embodiment, the vehicle system mainly comprises: the engine 1; the motor-generator 114 serving as a rotary electric machine; the crank angle sensor SN1, the accelerator position sensor SN10 and the like serving as an operating state sensor; the steering wheel 105; the steering angle sensor SN11; and the controller 60.

<Combustion Control>

Figure 4:
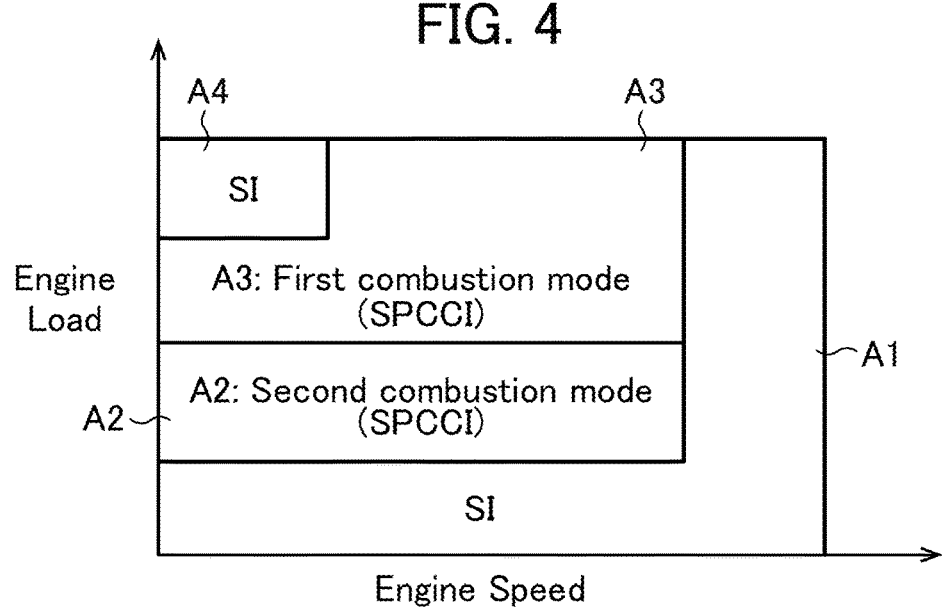
FIG. 4 is an explanatory diagram of an operating range of the engine in the vehicle system according to this embodiment.

Next, combustion control of the engine 1 in the vehicle system according to this embodiment will be described in detail. FIG. 4 is an explanatory diagram of an operating range of the engine 1 in the vehicle system according to this embodiment. More specifically, FIG. 4 is a simplified operating map for explaining a difference in combustion control depending on an engine speed and an engine load. This operating map shows four operating ranges: a first range A1; a second range A2; a third range A3; and a fourth range A4. The first range A1 is a combination of a range in which the engine speed is in a low and intermediate region, and the engine load is in a low (including no load) region, and a range in which the engine speed is in a high region, and the engine load is in an intermediate and high region. The second range A2 is a range (low and intermediate speed-intermediate load range) in which the engine speed is in the low and intermediate region, and the engine load is in a region higher than that of the first range A1. The third range A3 is a range (low and intermediate speed-high load range) in which the engine speed is in the low and intermediate region, and the engine load is in a region higher than that of the second range A2. The fourth range A4 is a range in which the engine speed is in the low region, and the engine load is close to a full-load line.

In the first range A1 and the fourth range A4, the SI combustion is performed. The SI combustion is a combustion pattern in which an air-fuel mixture in the combustion chamber 6 is ignited by spark ignition using the spark plug 16, and forcibly combusted based on flame propagation causing expansion of a combustion region from the ignition point toward surroundings thereof. That is, the SI combustion is a combustion mode in which the entire air-fuel mixture in each cylinder 2 is combusted based on propagation of flame produced by the spark plug 16.

In the second range A2 and the third range A3, the SPCCI combustion (partially premixed charge compression ignition combustion or spark controlled compression ignition combustion) is performed. The SPCCI combustion is a combination of the SI combustion and CI combustion. The CI combustion is a combustion pattern in which an air-fuel mixture is combusted by self-ignition in an environment where the air-fuel mixture is highly raised in temperature and pressure according to compression by the piston 5. The SPCCI combustion is a combustion pattern in which a part of an air-fuel mixture in the combustion chamber 6 is subjected to the SI combustion by spark ignition performed in an environment close to that causing self-ignition of the air-fuel mixture, and, after the SI combustion, the remaining air-fuel mixture in the combustion chamber is subjected to the CI combustion by self-ignition (caused by higher temperature and pressure resulting from the SI combustion). That is, the SPCCI combustion is a combustion mode in which at least a part of an air-fuel mixture in each cylinder 2 is combusted by self-ignition.

The SPCCI combustion includes: a combustion mode in which an air-fuel ratio of an air-fuel mixture to be formed in the combustion chamber 6 is set to the stoichiometric air-fuel ratio or on a richer side than the stoichiometric air-fuel ratio (first air-fuel ratio) (this combustion mode will hereinafter be referred to as "first combustion mode"); and a combustion mode in which the air-fuel ratio of the air-fuel mixture to be formed in the combustion chamber 6 is set to an air-fuel ratio on a leaner side than the stoichiometric air-fuel ratio (second air-fuel ratio) (this combustion mode will hereinafter be referred to as "second combustion mode"). More specifically, the first combustion mode is a mode in which the SPCCI combustion is performed under the condition that the air-fuel ratio (A/F) which is a weight ratio of air (fresh air) to fuel in the combustion chamber 6 is set to the stoichiometric air-fuel ratio ($\lambda=1$) or a smaller value close thereto (λ<1). It is needless to say that the stoichiometric (theoretical) air-fuel ratio A/F in the first combustion mode is λ=1 or 14.7/1. On the other hand, the second combustion mode is a mode in which the SPCCI combustion is performed under the condition that the air-fuel ratio (A/F) is set to a value larger than the stoichiometric air-fuel ratio (14.7). In this embodiment, the air-fuel ratio A/F of an air-fuel mixture to be formed in the second combustion mode is set in the range of about 25 to 30/1. For the SPCCI combustion, either one of the second combustion mode (λ>1) or the first combustion mode (λ≤1) is selected based on an operating state of the engine 1 (basically, the engine speed and the accelerator position).

Firstly, in the second range A2, the SPCCI combustion is performed in the second combustion mode (λ>1). Combustion control to be executed in the second range A2 by the controller 60 is as follows. The controller 60 operates to cause the injector 15 to inject fuel twice at two (first and second) fuel injection timings in an intermediate to later phase of a compression stroke. The controller 60 also operates to cause the spark plug 16 to ignite an air-fuel mixture at a timing around top dead center of the compression stroke and on a slightly advance side with respect to the top dead center of the compression stroke. The SPCCI combustion is triggered by this ignition, whereafter a part of the air-fuel mixture in the combustion chamber 6 is combusted based on flame propagation (SI combustion), and then the remaining air-fuel mixture is combusted by self-ignition (CI combustion).

Here, advantages of the SPCCI combustion will be described. The SPCCI combustion has a property that heat release increases more steeply when the CI combustion is being developed than when the SI combustion is being developed. That is, a rising slope of heat release in an initial combustion phase corresponding to the SI combustion is less than that of heat release in a subsequent combustion phase corresponding to the CI combustion. When the internal temperature and pressure of the combustion chamber 6 is raised by the SI combustion, an unburned air-fuel mixture is self-ignited, and thus the CI combustion is started. At a timing of the start of the CI combustion, the slope of a waveform of heat release rate changes from gentle to steep. Further, in the SPCCI combustion, in response to the above tendency of the heat release rate, the rate of rise in internal pressure of the combustion chamber 6 (dp/dθ) becomes smaller during the SI combustion than during the CI combustion.

After the start of the CI combustion, the SI combustion and the CI combustion are performed in parallel. In the CI combustion, the combustion speed of the air-fuel mixture is faster than in the SI combustion, so that the heat release rate becomes relatively large. However, the slope of the waveform of the heat release rate never becomes excessively steep, because the CI combustion is developed after top dead center of a compression stroke. Specifically, after passing through top dead center of a compression stroke, a motoring pressure is reduced along with downward movement of the piston 5. This suppresses the rise in the heat release rate, so that it becomes possible to avoid the situation where the dp/dθ during the CI combustion becomes excessively large. As above, in the SPCCI combustion, the CI combustion is essentially performed after the SI combustion, so that the dp/dθ as an index of combustion noise is less likely to become excessively large, and thereby it is possible to effectively suppress combustion noise, as compared to simple CI combustion (a case where the entire fuel is subjected to only the CI combustion).

Upon completion of the CI combustion, the SPCCI combustion is completed. In the CI combustion, the combustion speed is faster than in the SI combustion, as mentioned above, so that it is possible to advance a combustion completion timing, as compared to simple SI combustion (a case where the entire fuel is subjected to only the SI combustion). In other words, in the SPCCI combustion, the combustion completion timing can be set in an expansion stroke at a point closer to top dead center of a compression stroke. This makes it possible to improve fuel economy performance in the SPCCI combustion, as compared to the simple SI combustion.

Secondly, in the low load region in the third range, the SPCCI combustion is performed under the condition that the air-fuel ratio of an air-fuel mixture in the combustion chamber 6 is set to the stoichiometric air-fuel ratio (λ=1), which falls within the first combustion mode (λ≤1). In this case, the controller 60 operates to cause the injector 15 to execute a first fuel injection for injecting a relatively large amount of fuel, in an intake stroke, and then execute a second fuel injection for injecting fuel in an amount less than that of the first fuel injection, in a subsequent compression stroke. The controller 60 also operates to cause the spark plug 16 to ignite the air-fuel mixture at a timing on a slightly advance side with respect to top dead center of the compression stroke. The SPCCI combustion is triggered by this ignition, as with the aforementioned second combustion mode.

Further, in the high load region in the third range, the SPCCI combustion is performed under the condition that the air-fuel ratio of an air-fuel mixture in the combustion chamber 6 is set to a slightly rich side with respect to the stoichiometric air-fuel ratio (λ≤1), which falls within the first combustion mode. In this case, the controller 60 operates to cause the injector 15 to inject the entirety of or most of fuel to be injected within one combustion cycle, in an intake stroke. For example, the controller 60 operates to cause the injector 15 to inject fuel over a continuous time period from a latter phase of an intake stroke to an initial phase of a subsequent compression stroke. The controller 60 also operates to cause the spark plug 16 to ignite the air-fuel mixture at a timing around to top dead center of the compression stroke and on a slightly retard side with respect to the top dead center of the compression stroke. The SPCCI combustion is triggered by this ignition, as with the aforementioned second combustion mode.

The operating map has been described based on an example in which, in the third range A3, the air-fuel mixture formed at the stoichiometric air-fuel ratio (λ=1) and the air-fuel mixture formed at the air-fuel ratio slightly richer than the stoichiometric air-fuel ratio (λ≤1) are used depending on engine load. Alternatively, in the entire third range A3, the air-fuel mixture formed at the stoichiometric air-fuel ratio (λ=1) may be used.

Thirdly, in the fourth range A4, instead of the SPCCI combustion, the SI combustion is executed under the condition that an ignition timing of the spark plug 16 is retarded. In this case, the controller 60 operates to cause the injector 15 to execute a first fuel injection for injecting a relatively large amount of fuel, in an intake stroke, and then execute a second fuel injection for injecting fuel in an amount less than that of the first fuel injection, in a latter phase of a subsequent compression stroke (at a timing just before top dead center of the compression stroke). The controller 60 also operates to cause the spark plug 16 to execute ignition at a retarded timing. The ignition timing for the air-fuel mixture is set to a relatively retarded timing, e.g., a timing after passing through top dead center of a compression stroke by about 5 to 20° CA. The SI combustion is triggered by this ignition, whereafter the entire air-fuel mixture in the combustion chamber 6 is combusted based on flame propagation. The reason that the ignition timing in the fourth range A4 is retarded in the above manner is to prevent abnormal combustion such as knocking or pre-ignition.

Fourthly, in the first range A1, instead of the SPCCI combustion, orthodox SI combustion is executed. In this case, the controller 60 operates to cause the injector 15 to inject fuel over a continuous time period from an intake stroke to a subsequent compression stroke. The controller 60 also operates to cause the spark plug 16 to ignite an air-fuel mixture at a timing on a slightly advance side with respect to top dead center of the compression stroke. The SI combustion is triggered by this ignition, whereafter the entire air-fuel mixture in the combustion chamber 6 is combusted based on flame propagation.

<Vehicle Attitude Control>

Next, vehicle attitude control to be executed by the controller 60 in the vehicle system according to this embodiment will be described.

First of all, the outline of the vehicle attitude control in the vehicle system according to this embodiment will be described. In this embodiment, the controller 60 is configured to, when the steering wheel (steering) 105 is subjected to turning manipulation, set a target additional deceleration to be added to the vehicle 100, based on the steering angle detected by the steering angle sensor SN11 (more specifically, based on a steering speed calculated from the steering angle), and then set a decremental torque by which a torque to be given to the vehicle 100 is to be reduced so as to generate the target additional deceleration. Thus, the torque to be given to the vehicle 100 is reduced by the decremental torque, thereby generating a deceleration (target additional deceleration) in the vehicle 100, so that a load on the front road wheels (front road wheel load) can be increased to improve responsiveness of turning of the vehicle 100 with respect to the turning manipulation of the steering wheel 105.

Particularly, in this embodiment, the controller 60 is configured to change a control mode for generating the target additional deceleration in the vehicle 100, depending on a case where the first combustion mode of the SPCCI combustion is performed (i.e., the SPCCI combustion is performed at the first air-fuel ratio which is the stoichiometric air-fuel ratio or an air-fuel ratio on a richer side than the stoichiometric air-fuel ratio), and a case where the second combustion mode of the SPCCI combustion is performed (i.e., the SPCCI combustion is performed at the second air-fuel ratio which is an air-fuel ratio on a leaner side than the stoichiometric air-fuel ratio). Specifically, the controller 60 is configured to, in the first combustion mode, control the ignition timing of the spark plug 16 so as to generate the target additional deceleration in the vehicle 100, and, in the second combustion mode, control the regenerative electric power generation of the motor-generator 114 so as to generate the target additional deceleration in the vehicle 100. More specifically, the controller 60 is configured to, in the first combustion mode, retard the ignition timing (in this case, an output torque of the engine 1 is reduced) to reduce the torque to be given to the vehicle 100, thereby realizing the target additional deceleration, and, in the second combustion mode, regeneratively operate the motor-generator 114 (in this case, a regenerative torque (negative torque) causing braking of the vehicle 100 is generated) to reduce the torque to be given to the vehicle 100, thereby realizing the target additional deceleration.

If the ignition timing is retarded in the second combustion mode in which the air-fuel ratio is set on a lean side with respect to the stoichiometric air-fuel ratio, self-ignition is less likely to occur due to a lean air-fuel mixture, and thereby the SPCCI combustion becomes unstable. Therefore, in this embodiment, the controller 60 is configured to, in the second combustion mode, cause the motor-generator 114 to perform regenerative electric power generation, instead of retarding the ignition timing, thereby generating the target additional deceleration in the vehicle 100. This makes it possible to adequately execute the vehicle attitude control while ensuring combustion stability of the SPCCI combustion performed under the condition that the air-fuel ratio is set on the lean side.

In the vehicle attitude control, with a view to reducing the output torque of the engine 1 so as to generate the target additional deceleration in the vehicle 100, the amount of intake air to be introduced into the engine 1 is basically controlled (the throttle valve 32 and/or the intake valves 11 are controlled), but this control involves a relatively large delay. The ignition timing is controlled to compensate for such a delay. That is, the ignition timing is consequently retarded to quickly reduce the output torque of the engine 1, thereby realizing the vehicle attitude control. On the other hand, in the SPCCI combustion, with a view to realizing this combustion, an air amount, an EGR amount, a fuel injection amount and/or a fuel injection timing are basically controlled, but this control involves a relatively large delay. The ignition timing is consequently controlled to compensate for such a delay. Thus, if the ignition timing is controlled for the vehicle attitude control during the process of the SPCCI combustion, the control of the ignition timing for the SPCCI combustion is likely to become unable to be executed, thereby failing to adequately realize the SPCCI combustion. This problem becomes prominent, particularly in the SPCCI combustion performed under the condition that the air-fuel ratio is set on the lean side (performed in the second combustion mode). This is because self-ignition is less likely to occur due to a lean air-fuel mixture. Therefore, in this embodiment, the controller 60 is configured to, when the vehicle attitude control is executed in the second mode of the SPCCI combustion, cause the motor-generator 114 to perform regenerative electric power generation, instead of retarding the ignition timing, thereby generating the target additional deceleration in the vehicle 100.

On the other hand, even if the ignition timing is controlled for the vehicle attitude control during the process of the SPCCI combustion performed under the condition that the air-fuel ratio is set to the stoichiometric air-fuel ratio or on a richer side that the stoichiometric air-fuel ratio (performed in the first combustion mode), the above problem does not occur, i.e., combustion stability of the SPCCI combustion can be ensured. This is because the air-fuel ratio of the air-fuel mixture is $\lambda \leq 1$, and thereby self-ignition is more likely to occur. It is to be understood that the above problem also does not occur even if the ignition timing is controlled for the vehicle attitude control during the process of the SI combustion. Therefore, in this embodiment, the controller 60 is configured to, when executing the vehicle attitude control during the process of the first combustion mode of the SPCCI combustion and the SI combustion, retard the ignition timing in a normal manner to generate the target additional deceleration in the vehicle 100.

Further, in this embodiment, the controller 60 is configured to, in the second combustion mode, prohibit the motor-generator 114 from generating a driving torque (a torque for driving the front road wheels 102 (front wheel-driving torque)), i.e., prohibit the motor-generator 114 from assisting the output torque of the engine 1. The reason is as follows. When the motor-generator 114 is operated to perform the torque assist, the belt 112 coupled to the motor-generator 114 is tensioned in one direction (in a direction effecting the torque assist (torque assist direction) opposite to a direction effecting the regenerative action (regeneration direction), i.e., the belt 112 is stretched in the torque assist direction. Assume that, when the belt 112 is in such a state, it is attempted to execute the vehicle attitude control based on the regenerative action of the motor-generator 114, during the process of the second combustion mode, the regenerative action of the motor-generator 114 tends to delay. This is because it takes time from the state in which the belt 112 is tensioned in the torque assist direction through until the belt 112 is tensioned in the regeneration direction opposite to the torque assist direction. Therefore, in this embodiment, the controller 60 is configured to, in the second combustion mode, prohibit the torque assist of the motor-generator 114 so as to suppress a delay in regenerative action of the motor-generator 114 for the vehicle attitude control. That is, in the second combustion mode, with a view to ensuring realization of adequate vehicle attitude control during the process of the second combustion mode, the torque assist of the motor-generator 114 is prohibited to allow the belt 112 to be always tensioned (stretched) in the direction effecting the regenerative action of the motor-generator 114 (regeneration direction).

Figure 5:
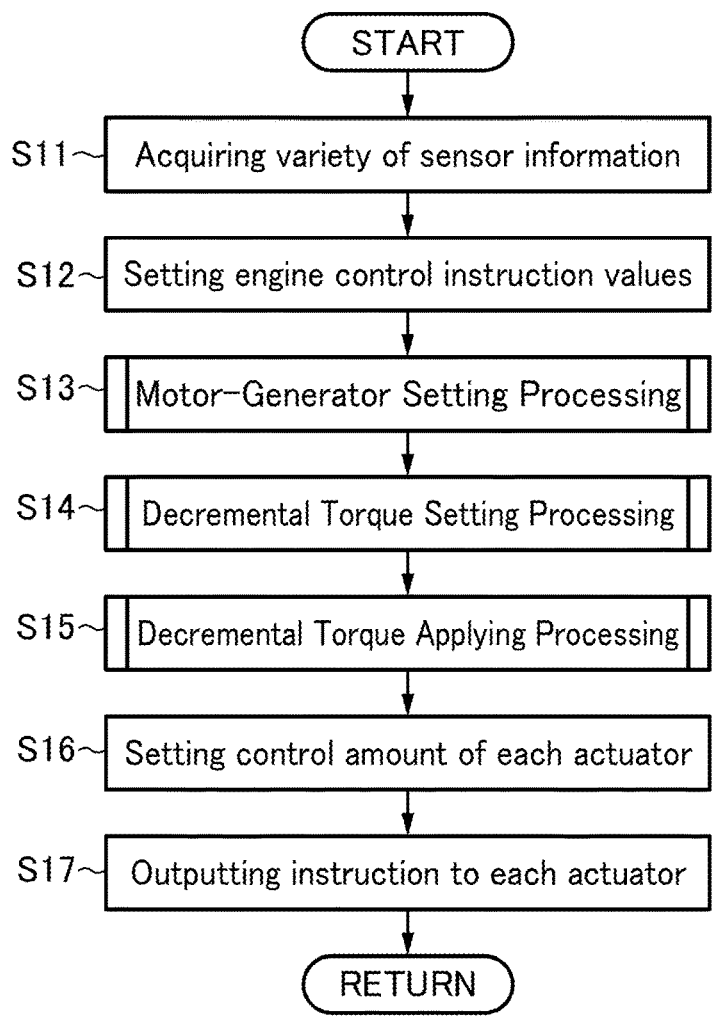
FIG. 5 is a flowchart showing overall control in the vehicle system according to this embodiment.
Figure 6:
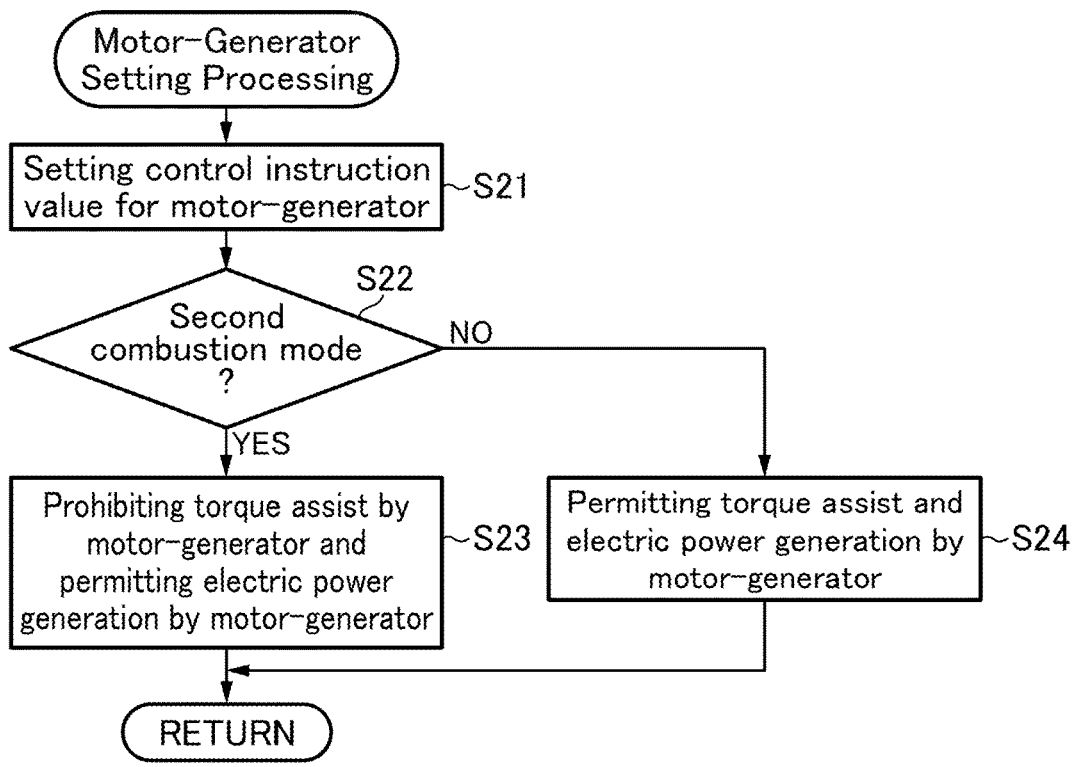
FIG. 6 is a flowchart showing motor-generator setting processing in the vehicle system according to this embodiment.
Figure 7:
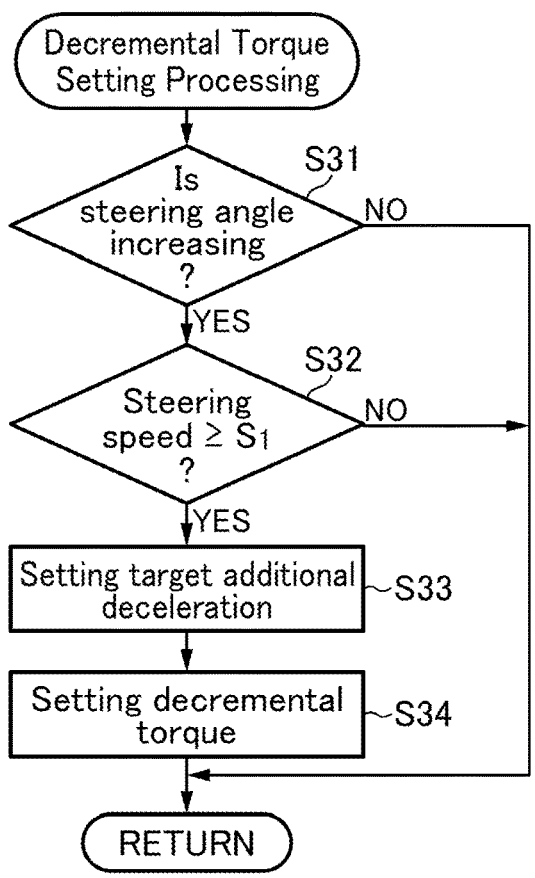
FIG. 7 is a flowchart showing decremental torque setting processing in the vehicle system according to this embodiment.
Figure 8:
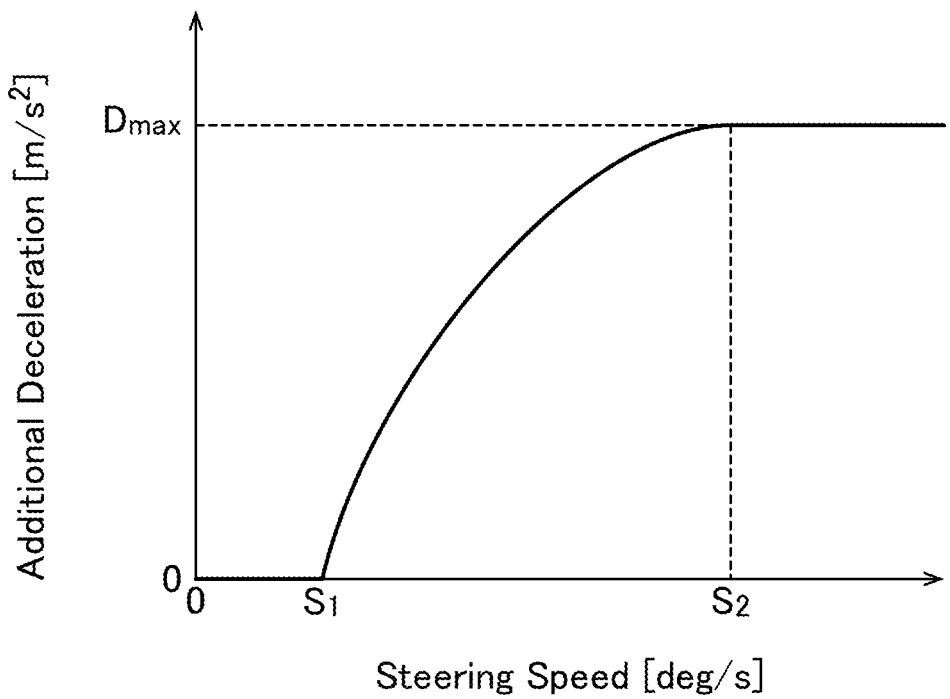
FIG. 8 is a map showing a relationship between an additional deceleration and a steering speed, in the vehicle system according to this embodiment.
Figure 9:
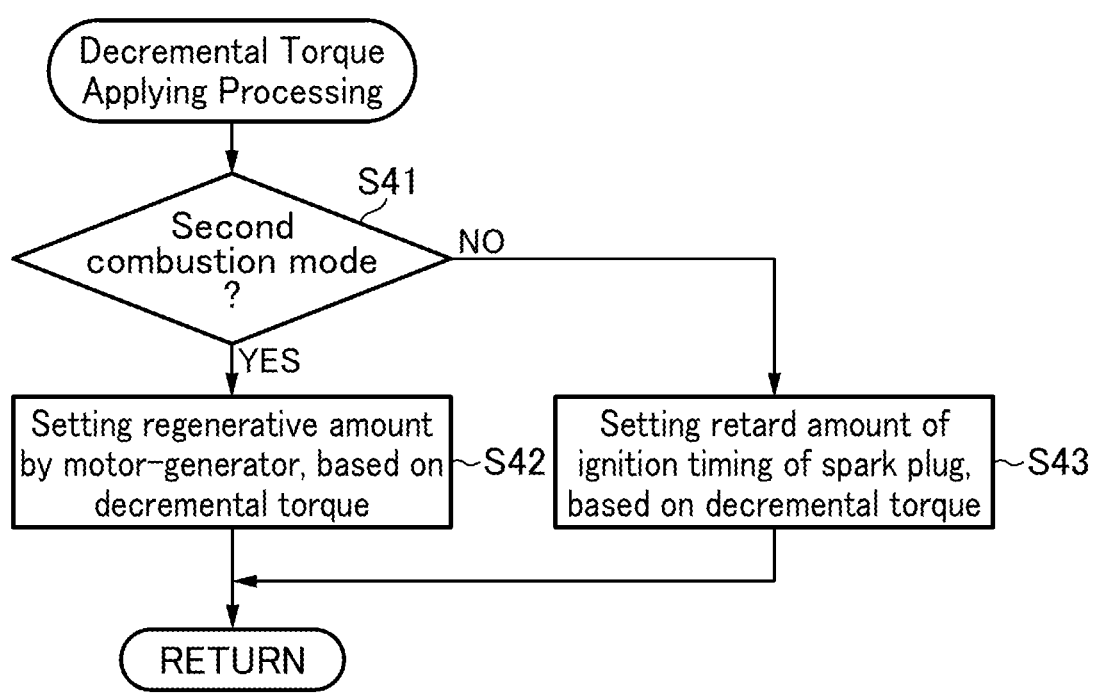
FIG. 9 is a flowchart showing decremental torque applying processing in the vehicle system according to this embodiment.

Next, with reference to FIGS. 5 to 9, the vehicle attitude control in the vehicle system according to this embodiment will be described. FIG. 5 is a flowchart showing the overall vehicle attitude control in the vehicle system according to this embodiment. FIG. 6 is a flowchart showing motor-generator setting processing in the vehicle system according to this embodiment, to be executed in the overall control illustrated in FIG. 5. FIG. 7 is a flowchart showing decremental torque setting processing in the vehicle system according to this embodiment, to be executed in the overall control illustrated in FIG. 5, and FIG. 8 is a map showing a relationship between the additional deceleration and the steering speed in the vehicle system according to this embodiment, to be used in the decremental torque setting processing illustrated in FIG. 7. FIG. 9 is a flowchart showing decremental torque applying processing in the vehicle system according to this embodiment, to be executed in the overall control illustrated in FIG. 5.

The vehicle attitude control processing routine illustrated in FIG. 5 is activated when an ignition switch of the vehicle 100 is turned on and thus electric power is applied to the controller 60, and repeatedly executed with a given period (e.g., 50 ms). Upon start of this control processing routine, the controller 60 operates, in step S11, to acquire a variety of sensor information. Specifically, the controller 60 operates to acquire sensor information corresponding to detection signals output from the aforementioned sensors SN1 to SN14. In particular, the controller 60 operates to acquire: the steering angle detected by the steering angle sensor SN11; the accelerator position detected by the accelerator position sensor SN10; the vehicle speed detected by the vehicle speed sensor SN14; the engine speed detected by the crank angle sensor SN1; and one of a plurality of speed stages currently set in the transmission 110 of the vehicle 100.

Subsequently, in step S12, the controller 60 operates to set control instruction values for the engine 1, based on the variety of sensor information acquired in the step S11. Specifically, the controller 60 firstly operates to set a target acceleration, based on the vehicle speed, the accelerator position, etc. In one example, the controller 60 operates to select, from among a plurality of acceleration characteristic maps each defining a relationship between an acceleration and the accelerator position, with respect to various values of the vehicle speed and the plurality of speed stages (the maps are preliminarily created and stored in a memory or the like), one acceleration characteristic map corresponding to a current value of the vehicle speed and a current one of the speed stages, and refer to the selected acceleration characteristic map to set, as a target acceleration, a value of the acceleration corresponding to a current value of the accelerator position. Then, the controller 60 operates to determine a target torque to be generated by the engine 1 so as to realize the target acceleration. In this case, the controller 60 operates to determine the target torque within a torque range outputtable by the engine 1, based on the current vehicle speed, speed stage, road grade, road surface μ, etc. Further, the controller 60 operates to refer to the operating map illustrated in FIG. 4 to select, from among the ranges A1 to A4, one range corresponding to current values of the engine load and the engine speed, and determine combustion control (control for the SI combustion or the SPCCI combustion (including the first and second combustion modes)) to be executed in the selected range. Then, the controller 60 operates to set control instruction values for various components (the intake VVT 13a, the exhaust VVT 14a, the injector 15, the spark plug 16, the throttle valve 32, the electromagnetic clutch 34, the bypass valve 39, and the EGR valve 53) of the engine 1 so as to realize the combustion control and the target torque.

Subsequently, in step S13, the controller 60 operates to execute a motor-generator setting processing subroutine illustrated in FIG. 6.

As shown in FIG. 6, upon start of the motor-generator setting processing subroutine, the controller 60 operates, in step S21, to set a control instruction value for the motor-generator 114. Specifically, the controller 60 operates to set a control instruction value for the motor-generator 114 to realize the target torque, based on the efficiency of the engine 1, the efficiency of the motor-generator 114, and the state-of-charge (SOC) of the battery for sending and receiving electric power with respect to the motor-generator 114. In this case, the controller 60 operates to refer to, e.g., a predetermined efficiency map of the engine 1, and a predetermined efficiency map (including both efficiencies of driving (acceleration) and regeneration) of the motor-generator 114. The controller 60 operates to set the control instruction value for the motor-generator 114 so as to generate the target torque in the vehicle 100 in a manner allowing both the engine 1 and the motor-generator 114 to be efficiently operated to a maximum extent, while preserving input-output restrictions according to the SOC of the battery. Preferably, the controller 60 is configured to modify the control instruction values for the engine 1 set in the step S12, based on the control instruction value for the motor-generator 114 set in the above manner.

Subsequently, in step S22, the controller 60 operates to determine whether or not the combustion mode of the engine 1 is set to the second combustion mode. Specifically, as one example, the controller 60 operates to determine a current combustion mode of the engine 1, based on the operating map illustrated in FIG. 4 and a current operating state (current values of the engine load and the engine speed) of the engine 1.

As a result of the determination in the step S22, when the combustion mode is determined to be set to the second combustion mode (the step S22: YES), the controller 60 proceeds to step S23, and operates to prohibit the torque assist of the motor-generator 114, and permits the regenerative electric power generation of the motor-generator 114. The controller 60 operates to prohibit execution of the torque assist as long as the second combustion mode is continued, even if a request for the torque assist of the motor-generator 114 is subsequently made from another control or processing. The reason that the torque assist is prohibited in this manner is to suppress a delay in regenerative action of the motor-generator 114 for the vehicle attitude control, when this control is executed during the process of the second combustion mode, as mentioned above. More specifically, by prohibiting the torque assist, the belt 112 coupled to the motor-generator 114 can be always tensioned (stretched) in the regeneration direction so as to ensure realizing adequate execution of the vehicle attitude control during the process of the second combustion mode. After completion of the processing in the step S23, the controller 60 completes the motor-generator setting processing subroutine, and returns to the main routine illustrated in FIG. 5.

On the other hand, when the combustion mode is determined not to be set to the second combustion mode (the step S22: NO), i.e., when the combustion mode is set to the first combustion mode or the SI combustion, the controller 60 proceeds to step S24, and operates to permit both the torque assist and the regenerative electric power generation of the motor-generator 114 in a normal manner. After completion of the processing in the step S24, the controller 60 completes the motor-generator setting processing subroutine, and returns to the main routine illustrated in FIG. 5.

Returning to FIG. 5, after completion of the motor-generator setting processing subroutine (the step S13), the controller 60 proceeds to step S14, and operates to execute a decremental torque setting processing subroutine illustrated in FIG. 7.

As shown in FIG. 7, upon start of the decremental torque setting processing subroutine, the controller 60 operates, in step S31, to determine whether or not the steering angle (absolute value) of the steering device 104 is increasing, i.e., the steering wheel 103 is being subjected to turning manipulation). As a result, when the steering angle is determined to be increasing (the step S31: YES), the controller 60 proceeds to step S32, and operates to determine whether or not the steering speed is equal to or greater than a given threshold $S_1$. In this case, the controller 60 operates to calculate the steering speed based on the steering angle acquired from the steering angle sensor SN11 in the step S11 illustrated in FIG. 5, and determine whether or not a calculated value of the steering speed is equal to or greater than the threshold $S_1$.

As a result of the determination in the step S32, when the steering speed is determined to be equal to or greater than the threshold $S_1$, the controller 60 proceeds to step S33, and operates to set a target additional deceleration based on the steering speed. This target additional deceleration is a deceleration to be added to the vehicle 100 according to the steering manipulation so as to control the vehicle attitude in conformity with the driver's intension.

Specifically, based on a relationship between the additional deceleration and the steering speed shown in the map illustrated in FIG. 8, the controller 60 operates to set, as the target additional deceleration, a value of the additional deceleration corresponding to the steering speed calculated in the step S32. In FIG. 8, the horizontal axis represents the steering speed, and the vertical axis represents the additional deceleration. As shown in FIG. 8, when the steering speed is equal to or less than the threshold $S_1$, a corresponding value of the additional deceleration is 0. That is, when the steering speed is equal to or less than the threshold $S_1$, the controller 60 operates to avoid performing control of adding a deceleration to the vehicle 1 in accordance with the steering manipulation.

On the other hand, when the steering speed is greater than the threshold $S_1$, a value of the additional deceleration corresponding to this steering speed gradually comes closer to a given upper limit $D_{max}$, as the steering speed becomes higher. That is, as the steering speed becomes higher, the additional deceleration becomes larger, and the rate of increase in the additional deceleration becomes smaller. This upper limit $D_{max}$ is set at a level (e.g., 0.5 m/s²≈0.05 G) that a driver does not feel control intervention even when the deceleration is added to the vehicle 1 in response to the steering manipulation. Further, when the steering speed is equal to or greater than a threshold $S_2$ greater than the threshold $S_1$, the additional deceleration is maintained at the upper limit $D_{max}$.

Subsequently, in step S34, the controller 60 operates to set the decremental torque, based on the target additional deceleration set in the step S33. Specifically, the controller 60 operates to determine, based on the current vehicle speed, speed stage, road grade, etc., acquired in the step S11, a value of the decremental torque to be given to the vehicle 100 so as to realize the target additional deceleration. After completion of the processing in the step S34, the controller 60 completes the decremental torque setting processing subroutine, and returns to the main routine illustrated in FIG. 5.

On the other hand, when the steering angle is determined, in the step S31, not to be increasing (the step S31: NO), or when the steering speed is determined, in the step S32, to be less than the threshold $S_1$ (the step S32: NO), the controller 60 completes the decremental torque setting processing subroutine without setting the decremental torque, and returns to the main routine illustrated in FIG. 5. In this case, the decremental torque is 0.

Returning to FIG. 5, after completion of the decremental torque setting processing subroutine (the step S14), the controller 60 proceeds to step S15, and operates to execute a decremental torque applying processing subroutine illustrated in FIG. 9.

As shown in FIG. 9, upon start of the decremental torque applying processing subroutine, the controller 60 operates, in step S41, to determine whether or not the combustion mode of the engine 1 is set to the second combustion mode. Specifically, as one example, the controller 60 operates to determine a current combustion mode of the engine 1, based on the operating map illustrated in FIG. 4 and a current operating state (current values of the engine load and the engine speed) of the engine 1.

As a result of the determination in the step S41, when the combustion mode is determined to be set to the second combustion mode (the step S41: YES), the controller 60 proceeds to step S42, and operates to set a regenerative amount (i.e., regenerative torque) in the motor-generator 114 corresponding to the decremental torque set in the aforementioned decremental torque setting processing subroutine, so as to realize this decremental torque by means of the regenerative electric power generation of the motor-generator 114. Thus, during the process of the second combustion mode of the SPCCI combustion, the vehicle attitude can be controlled by giving the regenerative torque (braking torque)

to the vehicle 100 so as to generate the target additional acceleration in the vehicle 100. After completion of the processing in the step S42, the controller 60 completes the decremental torque applying processing subroutine, and returns to the main routine illustrated in FIG. 5.

On the other hand, when the combustion mode is determined not to be set to the second combustion mode (the step S41: NO), i.e., when the combustion mode is set to the first combustion mode or the SI combustion, the controller 60 proceeds to step S43, and operates to set a retard amount of the ignition timing corresponding to the decremental; torque set in the aforementioned decremental torque setting processing subroutine, so as to realize this decremental torque by means of reduction in output torque of the engine 1, specifically, by means of retardation of the ignition timing of the spark plug 16. Thus, during the process of the first combustion mode or the SI combustion, the vehicle attitude can be controlled by reducing the output torque of the engine 1 to be given to the vehicle 100, so as to generate the target additional acceleration in the vehicle 100. After completion of the processing in the step S43, the controller 60 completes the decremental torque applying processing subroutine, and returns to the main routine illustrated in FIG. 5.

In the case where the decremental torque is not set in the decremental torque setting processing subroutine (i.e., the decremental torque is 0), processings in the steps S42 and S43 are not executed. That is, the setting of the regenerative amount in the motor-generator 114, and the setting of the retard amount of the ignition timing are not performed. In this case, the vehicle attitude control is not executed.

Returning to FIG. 5, after completion of the decremental torque applying processing subroutine (the step S15), the controller 60 proceeds to step S16. In the step S16, the controller 60 operates to set control values of various actuators for driving the components of the engine 1 and the motor-generator 114, based on the control instruction values for the engine 1, the control instruction value for the motor-generator 114, the regenerative amount in the motor-generator 114, and the retard amount of the ignition timing each set in the above processing routine, and contents of the setting made by the motor-generator setting processing subroutine. In this case, the controller 60 operates to set a limit value or range with respect to each of the state amounts, and set a control amount of each actuator to allow its related state amount to preserve limitation by the limit value or range. Then, the controller 60 proceeds to step S17, and operates to output control instructions to actuators of the engine 1 and the motor-generator 114, based on the control amounts set in the step S16. Subsequently, the comptroller 60 completes the overall control illustrated in FIG. 5.

Next, functions and advantage effects of the vehicle system according to this embodiment will be described.

Figure 10:
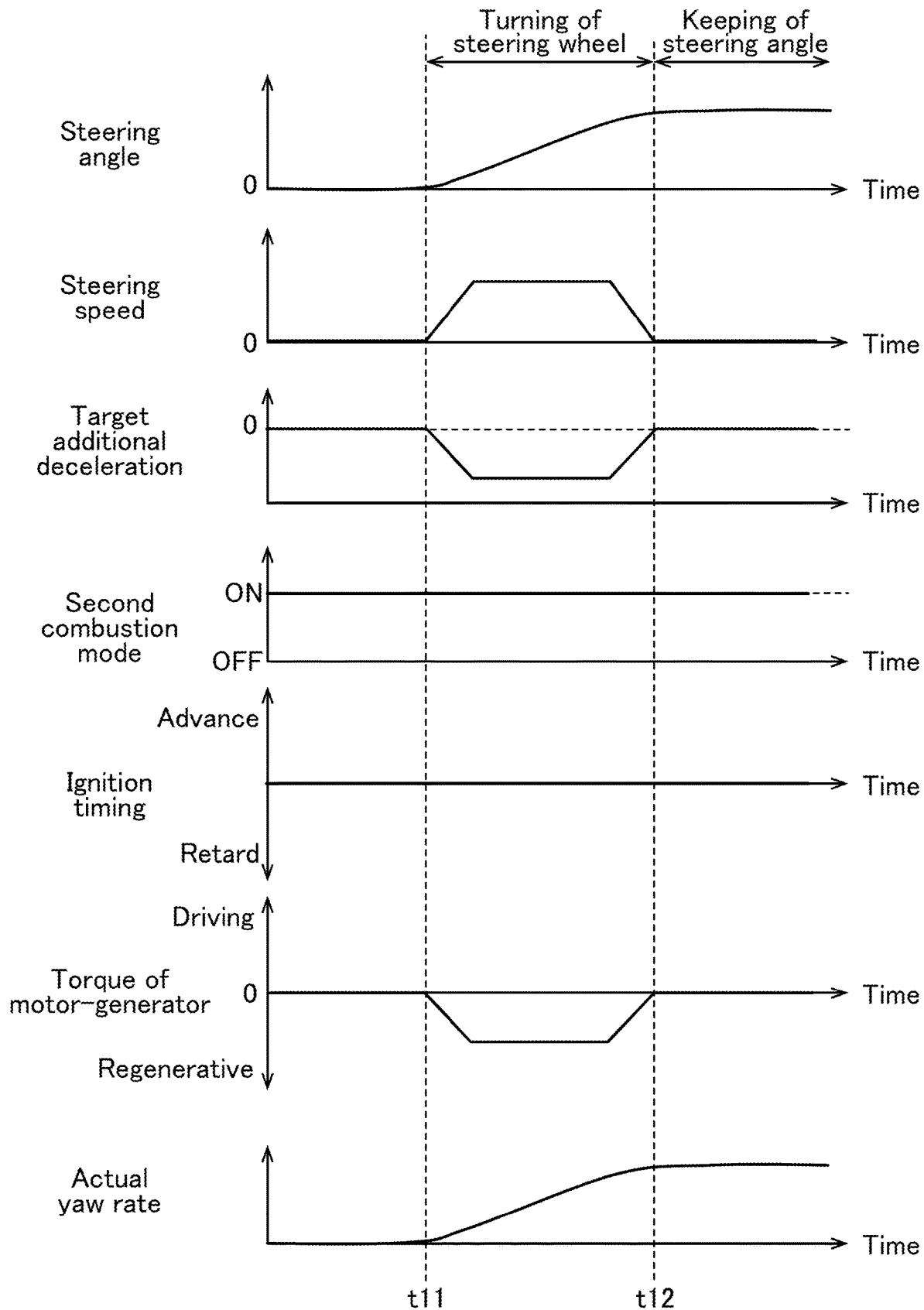
FIG. 10 illustrates one example of time charts to be measured when vehicle attitude control is executed in the vehicle system according to this embodiment.

FIG. 10 illustrates one example of time charts showing temporal changes in various parameters to be measured when the vehicle attitude control is executed in the vehicle system according to this embodiment. The time charts in FIG. 10 show, in order from top to bottom, the steering angle of the steering wheel 105, the steering speed of the steering wheel 105, the target additional deceleration set in the decremental torque setting processing subroutine in FIG. 7 (the step S33 in FIG. 7), an ON/OFF state of the second combustion mode of the SPCCI combustion, the ignition timing of the ignition plug 16 of the engine 1, a torque (driving torque or regenerative torque) of the motor-generator 114, and an actual yaw rate, respectively.

When a turning manipulation of the steering wheel 105 is performed, i.e., during turn-in of the vehicle 100, each of the steering angle and the steering speed is increased. As a result, at time t11, the steering speed becomes equal to or greater than the threshold $S_1$ (the step S32 in FIG. 7: YES), so that the target additional deceleration is set according to the steering speed (the step S33 in FIG. 7). Further, the value of the decremental torque is set in conformity to the target additional deceleration (the step S34 in FIG. 7). In the example illustrated in FIG. 10, the second combustion mode of the SPCCI combustion is executed, i.e., in an ON state. Thus, the vehicle attitude control is executed by controlling the motor-generator 114 to perform regenerative electric power generation so as to produce a regenerative torque set based on the decremental torque (the step S41 in FIG. 9: YES the step S42). In this case, the control of retarding the ignition timing is not executed, i.e., the ignition timing is maintained constant. By giving, to the vehicle 100, the regenerative torque (negative torque) produced in this manner, the target additional deceleration is generated in the vehicle 100, so that a front end of a vehicle body of the vehicle 100 is sunk downwardly, and a load on the front road wheels is increased. Thus, during the turning manipulation of the steering wheel 105, a desired actual yaw rate is generated in the vehicle 100. This makes it possible to improve vehicle responsiveness and linear feeling with respect to the turning manipulation of the steering wheel 105. Subsequently, when the steering speed is reduced during the vehicle attitude control, and becomes less than the threshold $S_1$ (the step S32 in FIG. 7: NO) at time t12, the vehicle attitude control is completed.

Figure 11:
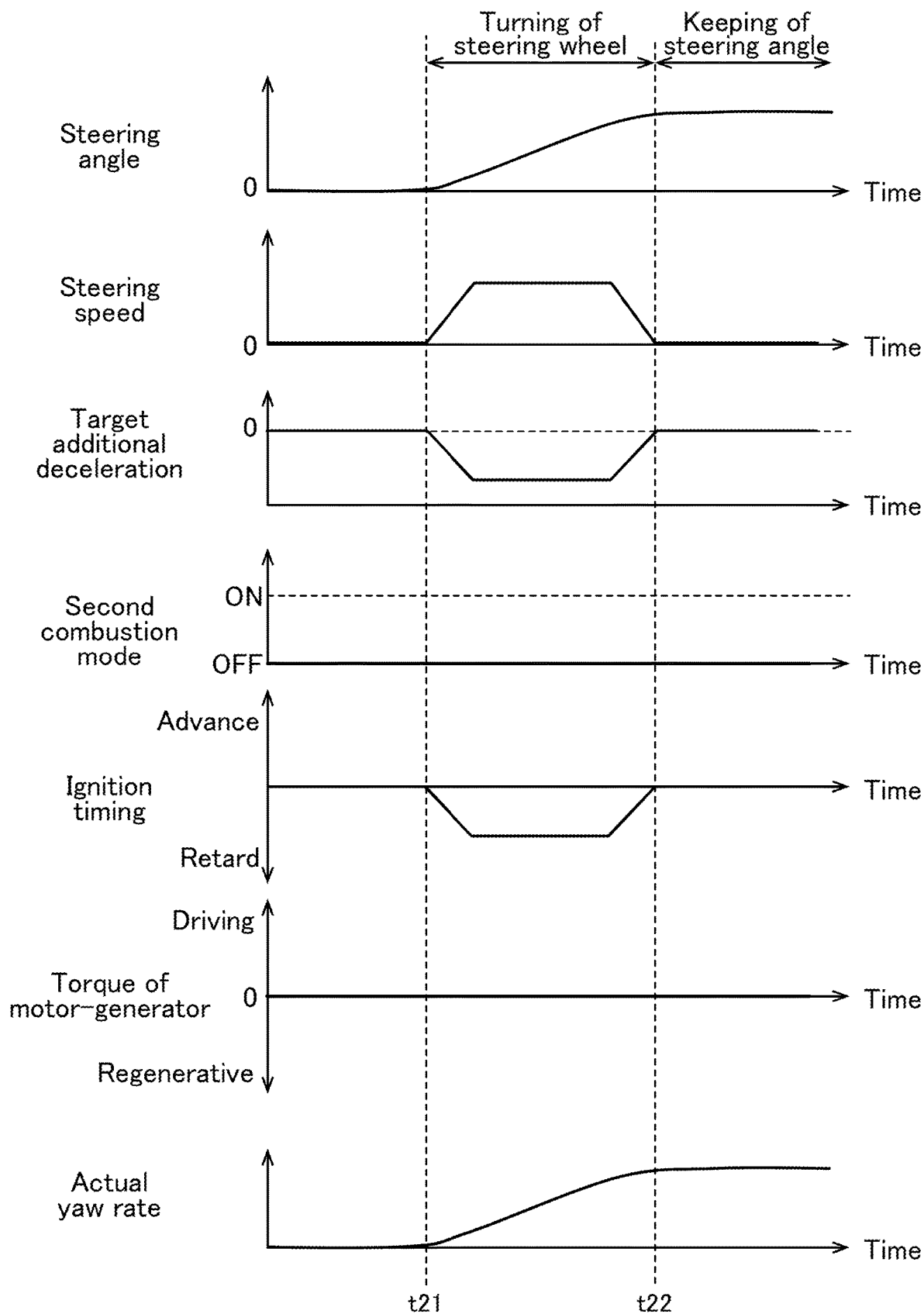
FIG. 11 illustrates another example of the time charts to be measured when the vehicle attitude control is executed in the vehicle system according to this embodiment.

FIG. 11 illustrates one example of time charts showing the temporal changes in various parameters to be measured when the vehicle attitude control is executed in the vehicle system according to this embodiment. The time charts in FIG. 11 also show, in order from top to bottom, the steering angle, the steering speed, the target additional deceleration, the ON/OFF state of the second combustion mode, the ignition timing, the torque of the motor-generator 114, and the actual yaw rate, respectively.

When the turning manipulation of the steering wheel 105 is performed, i.e., during turn-in of the vehicle 100, each of the steering angle and the steering speed is increased. As a result, at time t21, the steering speed becomes equal to or greater than the threshold $S_1$ (the step S32 in FIG. 7: YES), so that the target additional deceleration is set according to the steering speed (the step S33 in FIG. 7). Further, the value of the decremental torque is set in conformity to the target additional deceleration (the step S34 in FIG. 7). In the example illustrated in FIG. 11, the second combustion mode of the SPCCI combustion is not executed, i.e., in an OFF state, i.e., the first combustion mode or the SI combustion is performed. Thus, the vehicle attitude control is executed by retarding the ignition timing by a retard amount set based on the decremental torque (step S41 in FIG. 9: NO step S43) so as to reduce the output torque of the engine. In this case, the regenerative electric power generation of the motor-generator 114 is not performed. Here, the retard amount of the ignition timing is set on the basis of a preliminarily determined reference ignition timing (an ignition timing to be applied in a normal state, i.e., in a state in which the vehicle attitude control is not executed). Typically, as the reference ignition timing, a so-called "minimum advance for the best torque (MBT)" is used. In this case, by retarding the ignition timing from this reference ignition timing, the output torque of the engine 1 can be adequately reduced.

By retarding the ignition timing by the retard amount set in the above manner to reduce the output torque to be given to the vehicle 100, the target additional deceleration is generated in the vehicle 100, so that the front end of the vehicle body is sunk downwardly, and the load on the front road wheels is increased. Thus, during the turning manipulation of the steering wheel 105, a desired actual yaw rate is also generated in the vehicle 100. This makes it possible to improve vehicle responsiveness and linear feeling with respect to the turning manipulation of the steering wheel 105. Subsequently, when the steering speed is reduced during the vehicle attitude control, and becomes less than the threshold $S_1$ (step S32 in FIG. 7: NO) at time t22, the vehicle attitude control is completed.

As described above, in the vehicle system according to the above embodiment, the controller 60 is configured to, when the SPCCI combustion (first combustion mode) is performed at the stoichiometric air-fuel ratio or an air-fuel ratio set on a richer side than the stoichiometric air-fuel ratio, control the ignition timing of the spark plug 16 to generate the target additional deceleration in the vehicle 100, and, to, when the SPCCI combustion (second combustion mode) is performed at an air-fuel ratio set on a leaner side than the stoichiometric air-fuel ratio, control the regenerative electric power generation of the motor-generator 114 to generate the target additional deceleration in the vehicle 100. That is, the controller 60 is operable, in the second combustion mode, to generate the target additional deceleration in the vehicle 100 by causing the motor-generator 114 to perform regenerative electric power generation, without changing the ignition timing (while maintaining the ignition timing constant). This makes it possible to adequately execute the vehicle attitude control while ensuring combustion stability, during the process of the SPCCI combustion performed under the condition that the air-fuel ratio of the air-fuel mixture is set to the lean side.

In the above embodiment, the controller 60 is configured to, in the second combustion mode, prohibit the motor-generator 114 from generating the driving torque for driving the front road wheels 102, i.e., prohibit the motor-generator 114 from performing the torque assist for the engine 1. This makes it possible to suppress a delay in regenerative action of the motor-generator 114 for the vehicle attitude control, when this control is executed during the process of the second combustion mode. Specifically, by prohibiting the torque assist, the belt 112 coupled to the motor-generator 114 can be always tensioned (stretched) in the regeneration direction. Thus, upon a request for the vehicle attitude control made during the process of the second combustion mode, it becomes possible to quickly cause the motor-generator 114 to perform regenerative electric power generation, thereby adequately realizing the desired vehicle attitude control.

<Modifications>

In the above embodiment, the rubber belt 112 is shown as one example of a "winding member" as set forth in the appended claims. In another embodiment, instead of such a rubber belt 112, a belt formed from a material other than rubber or a chain different from a belt may be used as the winding member.

In the above embodiment, the ignition timing of the spark plug 16 is controlled to generate the target additional deceleration in the vehicle 100. In another embodiment, instead of or in addition to the control of the ignition timing, the degree of opening of the throttle valve 32 may be controlled. In this case, the throttle valve 32 may be controlled to move toward a fully closed position so as to increase a pumping loss, thereby generating the additional deceleration in the vehicle 100.

In the above embodiment, in the second combustion mode, the generation of the driving torque by the motor-generator 114 is prohibited. In another embodiment, in the second combustion mode, the generation of the driving torque by the motor-generator 114 may be suppressed, instead of completely prohibiting the generation of the driving torque. That is, the generation of the driving torque by the motor-generator 114 may be permitted to some extent. For example, in a specific situation where the driving torque should be generated by the motor-generator 114, typically when the vehicle 100 starts moving, the driving torque may be generated by the motor-generator 114 even in the second combustion mode.

In the above embodiment, the vehicle attitude control is executed based on the steering angle and the steering speed. In another embodiment, the vehicle attitude control may be executed based on a yaw rate, a lateral acceleration, a yaw acceleration and/or a lateral jerk, instead of the steering angle and the steering speed.

What is claimed is:

1. A vehicle system for a front-wheel drive vehicle, comprising:
   an engine comprising a spark plug and connecting with front road wheels;
   a rotary electric machine connecting with road wheels;
   an operating state sensor configured to detect an operating state of the engine;
   a steering wheel configured to be manipulated by a driver;
   a steering angle sensor configured to detect a steering angle corresponding to the manipulation of the steering wheel; and
   a controller configured to control the engine and the rotary electric machine, and composed of a circuitry,
   wherein the controller has a combustion mode in which a part of an air-fuel mixture in a cylinder of the engine is combusted by spark ignition of the spark plug, and then the remaining air-fuel mixture in the cylinder is combusted by self-ignition, and
   wherein the controller is configured:
      to set a target additional deceleration to be added to the vehicle, based on the steering angle detected by the steering angle sensor, when a turning manipulation of the steering wheel is performed;
      to set an air-fuel ratio of the air-fuel mixture to either one of a first air-fuel ratio and a second air-fuel ratio which is on a lean side with respect to the first air-fuel ratio, based on the operating state of the engine detected by the operating state sensor, when the engine is controlled to perform the combustion mode;
      to perform an ignition retard control to retard an ignition timing of the spark plug so as to generate the target additional deceleration in the vehicle, when the first air-fuel ratio is set; and
      to control a regenerative electric power generation of the rotary electric machine, without performing the ignition retard control for the first air-fuel ratio, so as to generate the target additional deceleration in the vehicle, when the second air-fuel ratio is set.

2. The vehicle system according to claim 1, wherein the rotary electric machine connects with the road wheels via a winding member, and wherein the controller is configured to suppress a generation of road wheel-driving torque by the rotary electric machine, when the second air-fuel ratio is set.

3. The vehicle system according to claim 2, wherein the winding member is a belt.

4. The vehicle system according to claim 1, wherein the first air-fuel ratio is a stoichiometric air-fuel ratio or an air-fuel ratio on a richer side than the stoichiometric air-fuel ratio.

5. The vehicle system according to claim 1, wherein the second air-fuel ratio is an air-fuel ratio on a leaner side than a stoichiometric air-fuel ratio.

6. The vehicle system according to claim 5, wherein the second air-fuel ratio is defined as a weight ratio of air to fuel in the air-fuel mixture, and wherein the weight ratio is set in a range of 25 to 30.

7. The vehicle system according to claim 1, wherein the controller is configured to calculate a steering speed from the steering angle detected by the steering angle sensor, and set the target additional deceleration based on the steering speed.

8. The vehicle system according to claim 1, wherein the controller is configured:
to set a target torque of the engine so as to realize a target acceleration set based on an accelerator position;
to determine a basic ignition timing of the spark plug so as to realize the target torque; and
to retard the ignition timing of the spark plug with respect to the basic ignition timing so as to generate the target additional deceleration in the vehicle, when the first air-fuel ratio is set.

9. The vehicle system according to claim 1, wherein, in a situation where the second air-fuel ratio is set, the controller is configured to generate the target additional deceleration in the vehicle by increasing an amount of the regenerative electric power generation of the rotary electric machine when the turning manipulation of the steering wheel is performed, more than when the turning manipulation of the steering wheel is not performed.

10. The vehicle system according to claim 8, wherein, in a situation where the second air-fuel ratio is set, the controller is configured to generate the target additional deceleration in the vehicle by increasing an amount of the regenerative electric power generation of the rotary electric machine, instead of retarding the ignition timing of the spark plug with respect to the basic ignition timing.

11. A vehicle system for a front-wheel drive vehicle, comprising:
an engine comprising a spark plug and connecting with front road wheels;
a rotary electric machine connecting with road wheels;
an operating state sensor configured to detect an operating state of the engine;
a steering wheel configured to be manipulated by a driver;
a steering angle sensor configured to detect a steering angle corresponding to the manipulation of the steering wheel; and
a controller configured to control the engine and the rotary electric machine, and composed of a circuitry,
wherein the controller has a combustion mode in which a part of an air-fuel mixture in a cylinder of the engine is combusted by spark ignition of the spark plug, and then the remaining air-fuel mixture in the cylinder is combusted by self-ignition,
wherein the controller is configured:
to set a target additional deceleration to be added to the vehicle, based on the steering angle detected by the steering angle sensor, when a turning manipulation of the steering wheel is performed;
to set an air-fuel ratio of the air-fuel mixture to either one of a first air-fuel ratio and a second air-fuel ratio which is on a lean side with respect to the first air-fuel ratio, based on the operating state of the engine detected by the operating state sensor, when the engine is controlled to perform the combustion mode;
to control an ignition timing of the spark plug so as to generate the target additional deceleration in the vehicle, when the first air-fuel ratio is set; and
to control a regenerative electric power generation of the rotary electric machine so as to generate the target additional deceleration in the vehicle, when the second air-fuel ratio is set,
wherein the rotary electric machine connects with the road wheels via a winding member, and
wherein the controller is configured to suppress a generation of road wheel-driving torque by the rotary electric machine, when the second air-fuel ratio is set.

12. The vehicle system according to claim 11, wherein the winding member is a belt.

13. A vehicle system for a front-wheel drive vehicle, comprising:
an engine comprising a spark plug and connecting with front road wheels;
a rotary electric machine connecting with road wheels;
an operating state sensor configured to detect an operating state of the engine;
a steering wheel configured to be manipulated by a driver;
a steering angle sensor configured to detect a steering angle corresponding to the manipulation of the steering wheel; and
a controller configured to control the engine and the rotary electric machine, and composed of a circuitry,
wherein the controller has a combustion mode in which a part of an air-fuel mixture in a cylinder of the engine is combusted by spark ignition of the spark plug, and then the remaining air-fuel mixture in the cylinder is combusted by self-ignition,
wherein the controller is configured:
to set a target additional deceleration to be added to the vehicle, based on the steering angle detected by the steering angle sensor, when a turning manipulation of the steering wheel is performed;
to set an air-fuel ratio of the air-fuel mixture to either one of a first air-fuel ratio and a second air-fuel ratio which is on a lean side with respect to the first air-fuel ratio, based on the operating state of the engine detected by the operating state sensor, when the engine is controlled to perform the combustion mode;
to control an ignition timing of the spark plug so as to generate the target additional deceleration in the vehicle, when the first air-fuel ratio is set; and
to control a regenerative electric power generation of the rotary electric machine so as to generate the target additional deceleration in the vehicle, when the second air-fuel ratio is set, and
wherein, in a situation where the second air-fuel ratio is set, the controller is configured to generate the target additional deceleration in the vehicle by increasing an amount of the regenerative electric power generation of the rotary electric machine when the turning manipulation of the steering wheel is performed, more than when the turning manipulation of the steering wheel is not performed.

14. The vehicle system according to claim 13, wherein, in the situation where the second air-fuel ratio is set, the controller is configured to generate the target additional deceleration in the vehicle by increasing the amount of the regenerative electric power generation of the rotary electric machine, instead of retarding the ignition timing of the spark plug with respect to a basic ignition timing.

\* \* \* \* \*